United States Patent
Mullins et al.

(10) Patent No.: US 9,984,508 B2
(45) Date of Patent: May 29, 2018

(54) LIGHT-BASED RADAR SYSTEM FOR AUGMENTED REALITY

(71) Applicant: DAQRI, LLC, Los Angeles, CA (US)

(72) Inventors: Brian Mullins, Altadena, CA (US); Matthew Kammerait, Studio City, CA (US); Mark Anthony Sararu, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 0 days. days.

(21) Appl. No.: 15/159,763

(22) Filed: May 19, 2016

(65) Prior Publication Data

US 2016/0343169 A1 Nov. 24, 2016

Related U.S. Application Data

(60) Provisional application No. 62/164,276, filed on May 20, 2015.

(51) Int. Cl.
*G09G 5/00* (2006.01)
*G06T 19/00* (2011.01)
(Continued)

(52) U.S. Cl.
CPC ............ *G06T 19/006* (2013.01); *G01S 17/36* (2013.01); *G01S 17/89* (2013.01); *G02B 27/017* (2013.01);
(Continued)

(58) Field of Classification Search
CPC .......... G06T 19/00; G06F 3/011; G06F 3/012; G02B 27/017
(Continued)

(56) References Cited

U.S. PATENT DOCUMENTS

| 4,403,857 A | * | 9/1983 | Holscher | G01S 17/36 342/127 |
| 5,870,227 A | * | 2/1999 | Rope | G02B 26/10 359/618 |

(Continued)

FOREIGN PATENT DOCUMENTS

| EP | 2378488 A2 | 10/2011 |
| WO | WO-2016187483 A1 | 11/2016 |

OTHER PUBLICATIONS

Barrenechea, P., FMCW radar with broadband communication capability, Radar Conference, Jan. 10, 2007, EURAD 2007, pp. 130-133.*

(Continued)

*Primary Examiner* — Ke Xiao
*Assistant Examiner* — Gordon Liu
(74) *Attorney, Agent, or Firm* — Schwegman Lundberg & Woessner, P.A.

(57) ABSTRACT

A system and method for measuring depth using an optical radar system are described. The system includes an optical radar, a camera, a display, and a processor. The optical radar emits a signal towards an object. The processor identifies an object depicted in an image captured with the camera. The processor generates the signal with a non-repeating pattern of amplitude and frequency, and computes a depth of the object based on a difference in phase angle between the signal emitted from the optical radar and a return signal received at the optical radar. The depth includes a distance between the optical radar and the object. The processor generates AR content based on the identified object and adjusts a characteristic of the AR content in the display based on the computed depth of the object.

10 Claims, 13 Drawing Sheets

(51) Int. Cl.
    *G01S 17/89*     (2006.01)
    *G06T 7/521*     (2017.01)
    *G01S 17/36*     (2006.01)
    *G06T 19/20*     (2011.01)
    *G02B 27/01*     (2006.01)

(52) U.S. Cl.
    CPC .............. *G06T 7/521* (2017.01); *G06T 19/20* (2013.01); *G02B 2027/014* (2013.01); *G02B 2027/0138* (2013.01); *G06T 2207/10152* (2013.01); *G06T 2215/16* (2013.01); *G06T 2219/2012* (2013.01); *G06T 2219/2016* (2013.01)

(58) Field of Classification Search
    USPC ........................................................ 345/633
    See application file for complete search history.

(56) References Cited

U.S. PATENT DOCUMENTS

| | | | | |
|---|---|---|---|---|
| 6,556,856 | B1* | 4/2003 | Mistretta | G01R 33/5635 |
| | | | | 324/306 |
| 6,825,455 | B1* | 11/2004 | Schwarte | G01J 9/00 |
| | | | | 250/214.1 |
| 8,405,680 | B1* | 3/2013 | Cardoso Lopes | G06T 19/00 |
| | | | | 345/426 |
| 8,890,953 | B1 | 11/2014 | Coley | |
| 9,237,874 | B2* | 1/2016 | DeMan | A61B 6/032 |
| 2001/0049837 | A1* | 12/2001 | Slack | A62B 18/04 |
| | | | | 2/6.2 |
| 2003/0179427 | A1* | 9/2003 | Lewis | G02B 26/085 |
| | | | | 359/212.1 |
| 2007/0091320 | A1* | 4/2007 | Hu | G01B 11/2513 |
| | | | | 356/604 |
| 2010/0245154 | A1 | 9/2010 | Szajnowski | |
| 2011/0217962 | A1 | 9/2011 | Leung | |
| 2012/0019557 | A1 | 1/2012 | Aronsson et al. | |
| 2012/0281132 | A1* | 11/2012 | Ogura | H04N 5/23212 |
| | | | | 348/348 |
| 2013/0113827 | A1 | 5/2013 | Forutanpour et al. | |
| 2013/0141221 | A1 | 6/2013 | Oksanen et al. | |
| 2014/0078488 | A1* | 3/2014 | Hoashi | G01S 7/4812 |
| | | | | 356/4.01 |
| 2015/0350659 | A1* | 12/2015 | Auyeung | H04N 19/70 |
| | | | | 375/240.26 |

OTHER PUBLICATIONS

"International Application Serial No. PCT/US2016/033375, International Search Report dated Aug. 26, 2016", 2 pgs.
"International Application Serial No. PCT/US2016/033375, Written Opinion dated Aug. 26, 2016", 12 pgs.

* cited by examiner

US 9,984,508 B2

LIGHT-BASED RADAR SYSTEM FOR AUGMENTED REALITY

REFERENCE TO RELATED APPLICATION

This application claims the benefit of priority of U.S. Provisional Application No. 62/164,276 filed May 20, 2015, which is herein incorporated by reference in its entirety.

TECHNICAL FIELD

The subject matter disclosed herein generally relates to the processing of data. Specifically, the present disclosure addresses systems and methods for measuring depth using a light-based radar for augmented reality.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

The shape and size of the AR content may be adjusted based on the depth of the objects in the real-world environment. Common depth sensors such as the Kinect from Microsoft, compute depth using triangulation of infrared signal from two cameras. An infrared laser projector projects a wide angle laser grid for the two cameras to calculate depth. The resolution or accuracy of depth cannot be adjusted for a particular area because the distance between the two cameras is constant and the wide angle of infrared laser project is meant to cover as much space as possible. Other methods of measuring depth include structured-light. However, the response time using structured-light technology can be slow.

BRIEF DESCRIPTION OF THE DRAWINGS

Some embodiments are illustrated by way of example and not limitation in the figures of the accompanying drawings.

DETAILED DESCRIPTION

Figure 1:
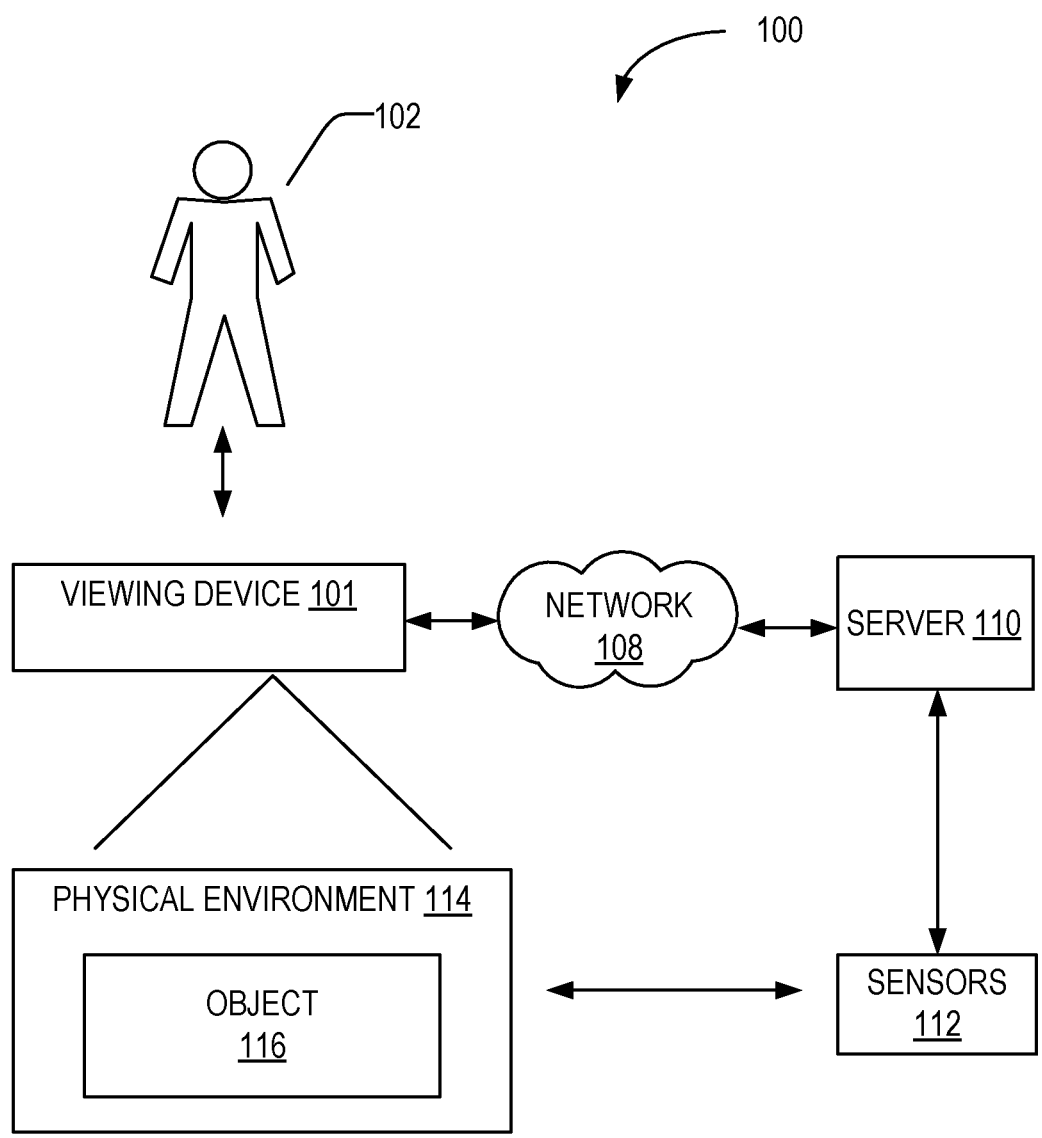
FIG. 1 is a block diagram illustrating an example of a network environment suitable for computing depth and generating AR content based on the computed depth, according to some example embodiments.

Example methods and systems are directed to a light-based radar system for augmented reality. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object such as a three-dimensional virtual object overlaid on an image of a physical object captured with a camera of a device. The device may include a smartphone, a tablet, a wearable device or head mounted device such as eyeglasses or a helmet having optical sensors and a display. The physical object may include a visual reference (e.g., a recognized image, pattern, or object) that the AR application can identify using pre-defined objects or machine vision. A visualization of the additional information, such as the three-dimensional (3D) virtual object overlaid or engaged with a view or an image of the physical object, is generated in a display of the head mounted device. The display of the head mounted device may be transparent. The 3D virtual object may be selected based on the recognized visual reference or captured image of the physical object. A rendering of the visualization of the 3D virtual object may be based on a position of the display relative to the visual reference. Other AR applications allow a user to experience visualization of the additional information overlaid on top of a view or an image of any object in the real physical world. The virtual object may include a 3D virtual object, a two-dimensional (2D) virtual object. For example, the 3D virtual object may include a 3D view of a chair or an animated dinosaur. The 2D virtual object may include a 2D view of a dialog box, menu, or written information such as statistics information for properties or physical characteristics of the object (e.g., temperature, mass, velocity, tension, stress).

An image of the virtual object may be rendered at the head mounted device or at a server in communication with the head mounted device. However, the size of the virtual object may be adjusted relative to the real physical world. For example, the size of a child's play ball may be adjusted so that it is perceived small at the end of a room and large when closer. The size of the virtual object may thus depend on the depth of objects in the real physical world. In another example, an empty mug sits on a table close to the user. The AR content may include virtual hot coffee inside the real mug. When the user moves the empty mug further away, the size of the AR content is adjusted to the perceived smaller size of the real mug. Therefore, the present disclosure describes a light-based radar system to measure depth for augmented reality devices.

A system and method for measuring depth (e.g., distance to an object) using a light-based radar system are described. A viewing device identifies an object in an image captured with a camera. The viewing device may generate a modulated signal with a pattern of random amplitude and frequency. The viewing device computes a depth of the object by measuring a difference in phase angle between the signal emitted from the light-based radar device and the signal received at the light-based radar device. The viewing device generates augmented reality content based on the identified object, and adjusts characteristics of the AR content in the display based on the computed depth of the object.

In one example embodiment, the viewing device includes a light-based radar device, a camera, a display, and a hardware processor. The hardware processor includes an augmented reality (AR) application that identifies the object in the image captured with the camera, computes the depth of the object, and adjusts a size of the AR content in the display based on the computed depth of the object.

The light-based radar device modulates a light signal with random amplitude and frequency. An emitter in the light-based radar device generates the modulated light signal with the random amplitude and frequency. A receiver of the light-based radar device receives the modulated light signal reflected back from the object.

The AR application includes a depth computation module that generates random amplitude and frequency for the light signal (e.g. example of frequencies include visible and non-visible light spectrum, modulated, unmodulated, laser with 500-2000 nm) and determines a shift in the phase angle between the modulated light signal generated from the emitter and the modulated light signal received at the receiver. In another example, the depth computation module identifies a first pattern in a portion of the modulated light signal generated from the emitter, and a second pattern in a portion of the modulated light signal received at the receiver. The depth computation module then matches the first pattern with the second pattern, and determines the shift in the phase angle between the first pattern and the second pattern. The depth computation module computes the distance between the device and the object based on the shift in the phase angle between the first pattern and the second pattern.

In another example embodiment, the light-based radar device includes at least one mirror to reflect the modulated light signal, and a mirror controller to adjust a direction of the at least one mirror and to sweep the modulated light signal into a planar region. A sweeping module generates a sweeping signal to the mirror controller. The sweeping signal identifies a first angle for horizontal sweeps and a second angle for vertical sweeps.

The depth computation module also includes a focus module connected to the mirror controller and a sweeping module. The focus module adjusts the sweeping signal to modify the first angle for horizontal sweeps and the second angle for vertical sweeps, and to adjust a size of the planar region. For example, the depth computation module identifies a region with low depth resolution in response to a depth computation accuracy falling below a depth accuracy threshold. The focus module adjusts the sweeping signal to limit the planar region to the region with low depth resolution.

The display comprises a transparent display of a visor of a helmet. The rendering module adjusts a combination of at least a size of the AR content displayed in the transparent display and a depth of field of the AR content based on the measured depth of the object.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment suitable for computing depth and generating AR content based on the computed depth, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 13 and 14.

The server 110 may be part of a network-based system. For example, the network-based system may be or include a cloud-based server system that provides additional information, such as 3D models or other virtual objects, to the viewing device 101.

A user 102 may wear the viewing device 101 to view an object 116 in a real world physical environment 114. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a camera and a display such as a smartphone, a tablet computer, a wearable computing device (e.g., watch or glasses). The computing device may be hand held or may be removably mounted to the head of the user 102. In one example, the display may be a screen that displays what is captured with a camera of the viewing device 101. In another example, the display of the viewing device 101 may be transparent or semi-transparent such as in lenses of wearable computing glasses or the visor or a face shield of a helmet.

The user 102 may be a user of an AR application in the viewing device 101 and at the server 110. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, letters, etc.

In one embodiment, the objects in the image are tracked and recognized locally in the viewing device 101 using a local context recognition dataset or any other previously stored dataset of the AR application of the viewing device 101. The local context recognition dataset module may include a library of virtual objects associated with real-world physical objects or references. In one example, the viewing device 101 identifies feature points in an image of the object 116. The viewing device 101 may also identify tracking data related to the object 116 (e.g., GPS location of the viewing device 101, orientation, distance to the object 116). If the captured image is not recognized locally at the viewing device 101, the viewing device 101 can download additional information (e.g., 3D model or other augmented data) corresponding to the captured image, from a database of the server 110 over the network 108.

In another embodiment, the object 116 in the image is tracked and recognized remotely at the server 110 using a remote context recognition dataset or any other previously stored dataset of an AR application in the server 110. The remote context recognition dataset module may include a library of virtual objects or augmented information associated with real-world physical objects or references.

Sensors 112 may be associated with, coupled to, related to the object 116 in the physical environment 114 to measure a location, status, and characteristics of the object 116. Examples of measured readings may include and but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the object 116 to show data related to the object 116. For example, the virtual indicators may include arrows with shapes and colors that change based on real-time data. The visualization may be provided to the viewing device 101 so that the viewing device 101 can render the virtual indicators in a display of the viewing device 101. In another embodiment, the virtual indicators are rendered at the server 110 and streamed to the viewing device 101. The viewing device 101 displays the virtual indicators or visualization corresponding to a display of the physical environment 114 (e.g., data is displayed adjacent to object 116).

The sensors 112 may include other sensors used to track the location, movement, and orientation of the viewing device 101 externally without having to rely on sensors internal to the viewing device 101. The sensors 112 may include optical sensors (e.g., depth-enabled 3D camera), wireless sensors (Bluetooth, Wi-Fi), GPS sensors, and audio sensors to determine the location of the user 102 having the viewing device 101, distance of the user 102 to the tracking sensors 112 in the physical environment 114 (e.g., sensors placed in corners of a venue or a room), the orientation of the viewing device 101 to track what the user 102 is looking at (e.g., direction at which the viewing device 101 is pointed, e.g., viewing device 101 pointed towards a player on a tennis court, viewing device 101 pointed at a person in a room).

In another embodiment, data from the sensors 112 and internal sensors in the viewing device 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, which features of the virtual object the user 102 interacted with (e.g., such as whether a user 102 tapped on a link in the virtual object), and any suitable combination thereof. The viewing device 101 receives a visualization content dataset related to the analytics data. The viewing device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 13 and 14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
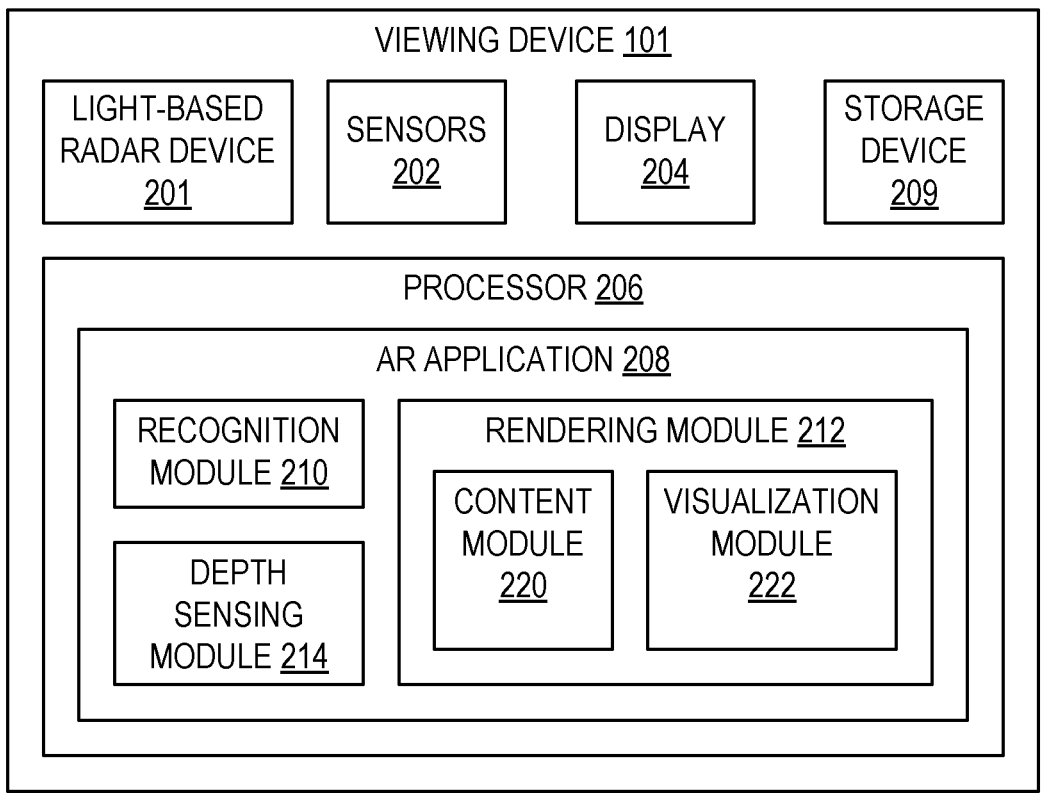
FIG. 2 is a block diagram illustrating an example embodiment of modules (e.g., components) of a viewing device.

FIG. 2 is a block diagram illustrating an example embodiment of modules (e.g., components) of a viewing device. The viewing device 101 includes a light-based radar device 201, sensors 202, a display 204, a processor 206, and a storage device 209. For example, the viewing device 101 may be a wearable computing device (e.g., glasses or helmet), a tablet computer, a navigational device, or a smart phone of a user. The user may be a human user (e.g., a human being), a machine user (e.g., a computer configured by a software program to interact with the viewing device 101), or any suitable combination thereof (e.g., a human assisted by a machine or a machine supervised by a human).

Figure 3:
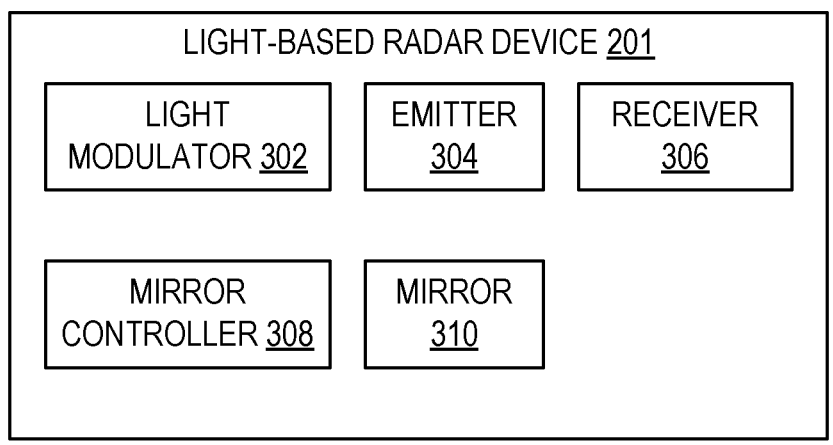
FIG. 3 is a block diagram illustrating an example embodiment of a light-based radar device.

The light-based radar device 201 (or optical device) determines depth or distance of the object 116 using a time-of-flight camera. The time-of-flight camera includes a modulated light source and a photo-detector for observing the reflected light. The phase shift between the illumination and the reflection is measured and computed into distance. The light-based radar device 201 further modulates a light source into a unique pattern (e.g., non-repetitive over a cycle). The light-based radar device 201 also includes a mirror that sweeps through to illuminate a region. The mirror can be adjusted to focus on a subregion to further improve depth accuracy of the subregion. In one example embodiment, the light-based radar device 201 includes a light modulator 302, an emitter 304, a receiver 306, a mirror controller 308, and a mirror 310 (e.g., micro-mirrors) as illustrated in FIG. 3.

The light-based radar device 201 includes a light modulator 302, an emitter 304, a receiver 306, a mirror controller 308, and a mirror 310. The light modulator 302 includes a radio frequency modulator that modulates a continuous wave source generated by the emitter 304. The light modulator 302 may modulate the light source from the emitter 304 in a sinusoid or square wave. In one example embodiment, the light modulator 302 randomly modulates the light source so as to generate a unique wave pattern for the light source. Furthermore, the light modulator 302 may be used in combination with pulsing the light source of the emitter 304 to detect phase shift. The emitter 302 includes a solid-state laser or an LED operating at near-infrared range. The receiver 306 includes an imaging sensor configured to respond to the near-infrared range and converts the reflected photonic energy to electrical current.

The mirror controller 308 includes hardware to control the direction of the mirror 310. The mirror controller 308 operates the mirror to reflect the light source from the emitter 304 and to sweep a planar region. The mirror controller 308 operates in conjunction with the light modulator 302 to sweep the planar region at a frequency based on the modulated light source. For example, the mirror 310 may sweep at a faster rate to sample different areas in response to a shorter modulated wavelength of the light source. In other example, the mirror controller 308 includes an actuator coupled to one or more mirrors to sweep the planar region. The frequency at which the actuator operates is based on the modulated wavelength. Several mirrors may operate at different frequencies so that one mirror generates a higher resolution than the other mirror. The mirror with the higher operating frequency may sweep an area (or a sub-region) of interest which the other mirror operating at a lower frequency may sweep the entire planar region including the area of interest.

Referring back to FIG. 2, the sensors 202 includes, for example, a proximity or location sensor (e.g., Near Field Communication, GPS, Bluetooth, Wi-Fi), an optical sensor (s) (e.g., camera), an orientation sensor(s) (e.g., gyroscope, or an inertial motion sensor), an audio sensor (e.g., a microphone), or any suitable combination thereof. For example, the sensors 202 may include rear facing camera(s) and front facing camera(s) disposed in the viewing device 101. It is noted that the sensors 202 described herein are for illustration purposes. Sensors 202 are thus not limited to the ones described. The sensors 202 may be used to generate internal tracking data of the viewing device 101 to determine what the viewing device 101 is capturing or looking at in the real physical world.

The display 204 may include a transparent visor or face shield of the helmet. The display 204 may also include a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include an AR application 208 for creating a virtual display of real-time data or augmented data related to the object 116 when the viewing device 101 captures an image of the object 116. In one example embodiment, the AR application 208 may include a recognition module 210, a rendering module 212, and a depth sensing module 214.

The recognition module 210 identifies the object that the viewing device 101 is pointed to. The recognition module 210 may detect, generate, and identify identifiers such as feature points of the physical object being viewed or pointed at by the viewing device 101 using an optical device of the viewing device 101 to capture the image of the physical object. As such, the recognition module 210 may be configured to identify one or more physical objects. The identification of the object may be performed in many different ways. For example, the object recognition module 210 determines feature points of the object based on several image frames of the object. The recognition module 210 also determines the identity of the object using any visual recognition algorithm. In another example, a unique identifier may be associated with the object. The unique identifier may be a unique wireless signal or a unique visual pattern such that the recognition module 210 can look up the identity of the object based on the unique identifier from a local or remote content database.

Furthermore, the recognition module 210 may be configured to determine whether the captured image matches an image locally stored in a local database of images and corresponding additional information (e.g., three-dimensional model and interactive features) in the storage device 222 of the viewing device 101. In one embodiment, the recognition module 210 retrieves a primary content dataset from the server 110, and generates and updates a contextual content dataset based on an image captured with the viewing device 101.

The rendering module 210 generates the virtual content based on the recognized or identified object 116. For example, the virtual content may include a three-dimensional rendering of King Kong based on a recognized picture of the Empire State building. In one example embodiment, the rendering module 218 includes a content module 220 and a visualization module 222.

The content module 220 retrieves the virtual content associated with the identified object 116. The virtual content includes, for example, a three-dimensional model (e.g., 3D model of King Kong). Furthermore, the virtual content can include effects, animations, or behaviors, or colors of the virtual content. For example, a three-dimensional model of King Kong may be animated to show him smashing helicopters circling King Kong at the top of the Empire State building. In another example, helicopters appear in more details as the user gets closer to the Empire State building. In another example, King Kong may appear calmer in response to specific voice commands (e.g., "calm down") of the user. The content module 220 may associate other characteristics with other predefined parameters based on data from the sensors 202. The virtual content may be stored locally in the storage device 209 or remotely in the server 110.

The visualization module 222 generates or modifies a visualization of the virtual content in the captured image of the real-world object. For example, the visualization module 222 renders a three-dimensional model of the virtual content in the display 204 of the viewing device 101. The user 102 of the viewing device 101 visually perceives the three-dimensional model as an overlay. For example, the user 102 may visually perceive a virtual dog sitting on top of a real world dog house. The visualization module 222 communicates display signals of a 3D model of the virtual dog to the display 204.

In another example embodiment, the visualization module 222 renders a visualization of the characteristic of the virtual content in the display 204 of the viewing device 101. The content and characteristic of the three-dimensional virtual model may be a function of data from sensors 202 of the viewing device 101. For example, if one of the sensors 202 indicates a temperature of 40 degrees Fahrenheit at a specific location in a factory, the visualization module 222 generates a visualization of fast moving exit arrows correlated to the green pedestrian markings on the floor of the factory. As such, the nature and characteristics of the virtual content generated or accessed may be a function of a combination of a recognized object, a color of the recognized object, and data from sensors 202 of the viewing device 101.

In one example embodiment, the visualization module 222 receives data from the server 110 to render the visualization. In another example embodiment, the visualization module 222 receives the rendered object. The visualization module 222 further determines the position and size of the rendered object to be displayed in relation to an image of the object. For example, the visualization module 222 places a virtual three-dimensional model of an animated heart with the size and position based on the image of the subject such that the animated heart is displayed on the chest area of the subject with the appropriate size. If the subject is wearing a red T shirt, the virtual three-dimensional model of an animated heart may be moving at a faster pace than a subject wearing a darker T shirt. The visualization module 222 may track the image of the subject and render the virtual object based on the position of the image of the subject in the display 204.

The viewing device 101 may access from a local memory a visualization model (e.g., vector shapes) corresponding to the image of the object (e.g., bridge). In another example, the viewing device 101 receives a visualization model corresponding to the image of the object from the server 110. The viewing device 101 then renders the visualization model to be displayed in relation to an image of the object being displayed in the viewing device 101 or in relation to a position and orientation of the viewing device 101 relative to the object. The visualization module 222 may adjust a position of the rendered visualization model in the display 204 to correspond with the last tracked position of the object.

The visualization module 222 may include a local rendering engine that generates a visualization of a three-dimensional virtual object overlaid (e.g., superimposed upon, or otherwise displayed in tandem with) on an image of a physical object captured by a camera of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position of the camera of the viewing device 101 relative to the physical object.

In one example embodiment, the visualization module 222 retrieves three-dimensional models of virtual objects associated with a captured image of a real-world object. For example, the captured image may include a visual reference (also referred to as a marker) that consists of an identifiable image, symbol, letter, number, machine-readable code. For example, the visual reference may include a bar code, a quick response (QR) code, a pattern, or an image that has been previously associated with a three-dimensional virtual object (e.g., an image that has been previously determined to correspond to the three-dimensional virtual object).

In one example embodiment, the visualization module 222 identifies the physical object (e.g., a physical telephone), accesses virtual functions (e.g., increase or lower the volume of a nearby television) associated with physical manipulations (e.g., lifting a physical telephone handset) of the physical object, and generates a virtual function corresponding to a physical manipulation of the physical object.

Figure 4:
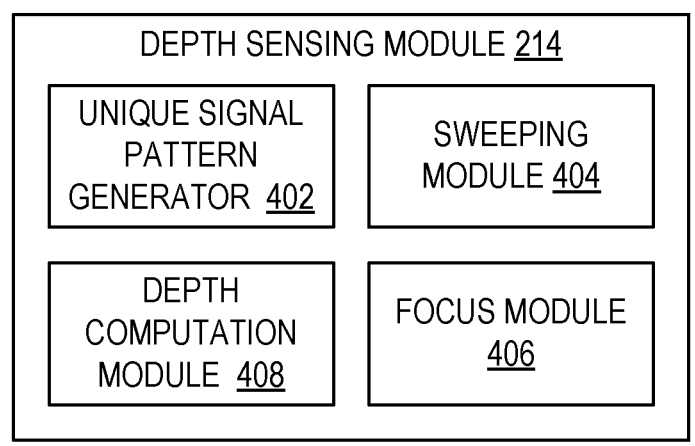
FIG. 4 is a block diagram illustrating an example embodiment of modules of a depth computation module.

The depth sensing module 214 generates a unique signal pattern. In one example, the unique signal pattern may be based on a combination of random frequencies and amplitudes. In another example, the unique signal pattern may be based on a non-repeating pattern over a predefined period of time. The pattern does not repeat for a predefined period of time. The length of the cycle time may be determined such that the pattern of the reflected wave does not coincide with the emitted wave (e.g. matching peaks or lows). For example, the depth sensing module 214 may generate a pattern of unique wave signals using the same near-infrared frequency. The pattern may be unique and non-repeating. In another example, the depth sensing module 214 generates a pattern of unique wave signals having the same amplitude but with different frequencies. The depth sensing module 214 computes a depth of the object based on a shift in the phase angle between the signal emitted from the light-based radar device 201 and the signal received at the light-based radar device 201. Furthermore, the depth sensing module 214 can further adjust the size and shape of the probing region. In one example embodiment, the depth sensing module 214 includes a unique signal pattern generator 402, a sweeping module 404, a depth computation module 408, and a focus module 406 as illustrated in FIG. 4.

The unique signal pattern generator 402 generates a combination of random amplitudes and frequencies for the modulated light signal. The unique signal pattern generator 402 communicates the pattern of unique wave signals to the light modulator 302 of the light-based radar device 201 of FIG. 3. The light modulator 302 adjusts the modulation frequency of the electrical signal to the emitter 304 to control and manipulate the frequency and amplitude of the light signal generated from the emitter 304.

In one example, the unique signal pattern generator 402 modulates a signal with a duration delta t, to form a unique wave pattern. The unique signal pattern generator 402 then pulses the pattern for the duration of delta t each time. One advantage of having a unique pattern is in efficiently identifying the corresponding peaks or dips in a wave signal and measuring a phase angle different between the corresponding peaks or dips. The unique signal pattern generator 402 is capable of modulating a complex to a simple wave pattern based on a frequency of random intensities.

In another example, the unique signal pattern generator 402 generates a first set of patterns for close objects, and a second set of patterns for distant objects. For example, the first set of patterns for distant objects may include a higher modulation in intensity of the wave signal for better accuracy. The second set of patterns for close objects may include a lower modulation in intensity of the wave signal. The unique signal pattern generator 402 may form different types of patterns based on the distance thresholds (e.g., near, close, far, distant, etc.). Each distance thresholds may be predefined based on the identification of the physical environment 114 and/or the object 116. For enclosed physical environments (e.g., in a factory), the distance thresholds may be smaller than for open physical environments (e.g., on a sports field).

The depth computation module 408 computes the depth of each sampling points based on the modulated signal reflected back and captured at the receiver 306. In one example embodiment, the depth computation module 408 determines a shift in the phase angle between the modulated light signal generated from the emitter 304 and the modulated light signal received at the receiver 306.

The depth computation module communicates with the visualization module 222 to determine a size of the three-dimensional model of the virtual content based on the depth of the object or distance of the object 116 to the display 204. For example, the size of a virtual King Kong may become larger as the viewing device 101 gets closer to the Empire State building.

The sweeping module 404 is connected to the mirror controller 308. The sweeping module 404 generates a sweeping signal to the mirror controller 308. The sweeping signal identifies a first angle for horizontal sweeps and a second angle for vertical sweeps. The sweeping signal can be adjusted to narrow the probing region.

The focus module 406 is connected to the mirror controller 308 and the sweeping module 404. The focus module 406 adjusts the sweeping signal to modify the first angle for horizontal sweeps and the second angle for vertical sweeps and to adjust a size of the planar region. For example, the focus module 406 determines that an area has a low depth resolution in response to a depth computation accuracy falling below a depth accuracy threshold. In another example, the focus module 406 determines that the number of samples for a specific area falls below a threshold number. As such, the focus module 406 may direct the mirror controller 308 to increase the sampling within the specific area to increase the number of samples of modulated light signal reflected from the specific area.

Referring back to FIG. 2, the storage device 209 may be configured to store a database of identifiers of physical objects, tracking data, and corresponding virtual objects having colors and characteristics a function of a color of a recognized physical object. In another embodiment, the database may also include visual references (e.g., images) and corresponding experiences (e.g., three-dimensional virtual objects, interactive features of the three-dimensional virtual objects, animations of the three-dimensional virtual objects, characteristics of the three-dimensional virtual objects). For example, the visual reference may include a machine-readable code or a previously identified image (e.g., a picture of a superhero character). The previously identified image of the superhero character may correspond to a three-dimensional virtual model of the superhero character that can be viewed from different angles by manipulating the position of the viewing device 101 relative to the object 116.

In one embodiment, the storage device 209 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular drawings or cartoons and their corresponding experiences (e.g., virtual objects that represent the ten most drawings or cartoons). In another example, the server 110 may generate the first set of images based on the most popular or often scanned images received at the server 110. Thus, the primary content dataset does not depend on objects or images scanned by the recognition module 210 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the recognition module 210 of the viewing device 101.

In one embodiment, the viewing device 101 may communicate over the network 108 with the server 110 to retrieve a portion of a database of visual references, corresponding three-dimensional virtual objects, and corresponding features of the three-dimensional virtual objects. The network 108 may be any network that enables communication between or among machines, databases, and devices (e.g., the viewing device 101).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
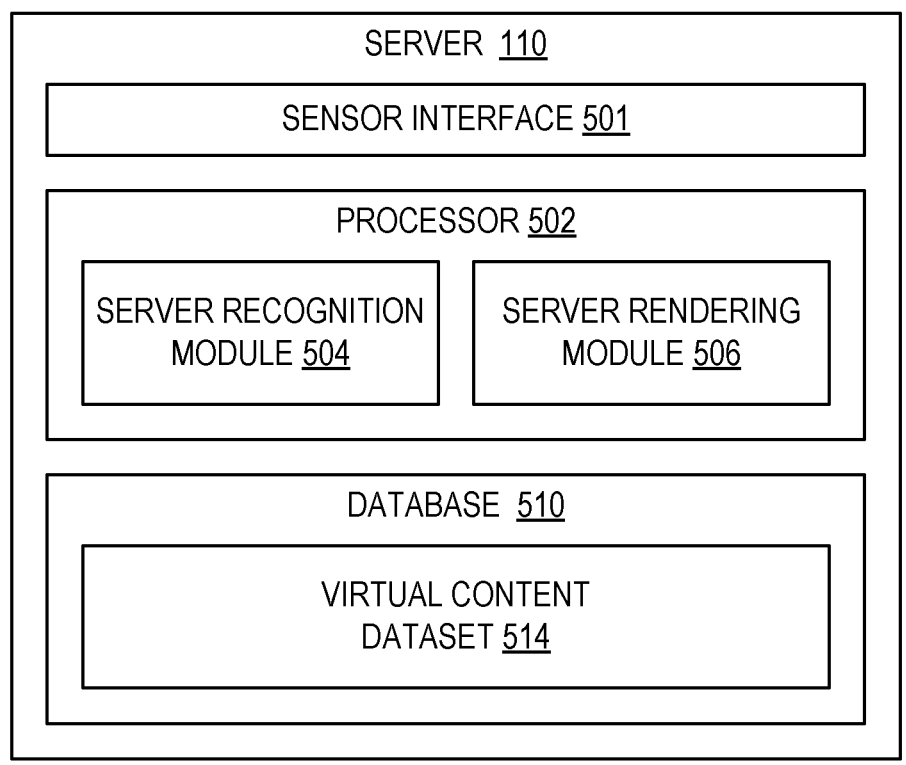
FIG. 5 is a block diagram illustrating an example embodiment of a server.

FIG. 5 is a block diagram illustrating modules (e.g., components) of the server 110. The server 110 includes a processor 502 and a database 510. The processor 502 includes a server recognition module 504, and a server AR rendering module 506. The server recognition module 504 operates in a similar way to the recognition module 214 of the viewing device 101. For example, the server recognition module 504 identifies the object 116 based on a captured image received from the viewing device 101. In another example, the viewing device 101 already has identified the object 116 and provides the identification information to the server recognition module 504.

The server rendering module 506 also operates in a similar way as the rendering module 212 of the AR device 105. For example, the server rendering module 212 retrieves the virtual content based on the object identified in the received image from the viewing device 101 and renders the 3D model of the virtual content.

The database 510 may store a virtual content dataset 514. The virtual content dataset 514 may store a primary content dataset and a contextual content dataset. The primary content dataset comprises a first set of images, colors, and corresponding virtual object models. The server recognition module 504 determines that a captured image received from the viewing device 101 is not recognized in the primary content dataset, and generates the contextual content dataset for the viewing device 101. The contextual content dataset may include a second set of virtual object models. The virtual content dataset 514 includes models of virtual objects (e.g., a three-dimensional model of an object) to be generated upon receiving a notification associated with an image of a corresponding physical object. The characteristics of virtual content dataset include a table of identified objects and/or colors with characteristics or behaviors (e.g., animation, effects, sound, music, etc.) that correspond to the sample color values from the captured image.

Figure 6:
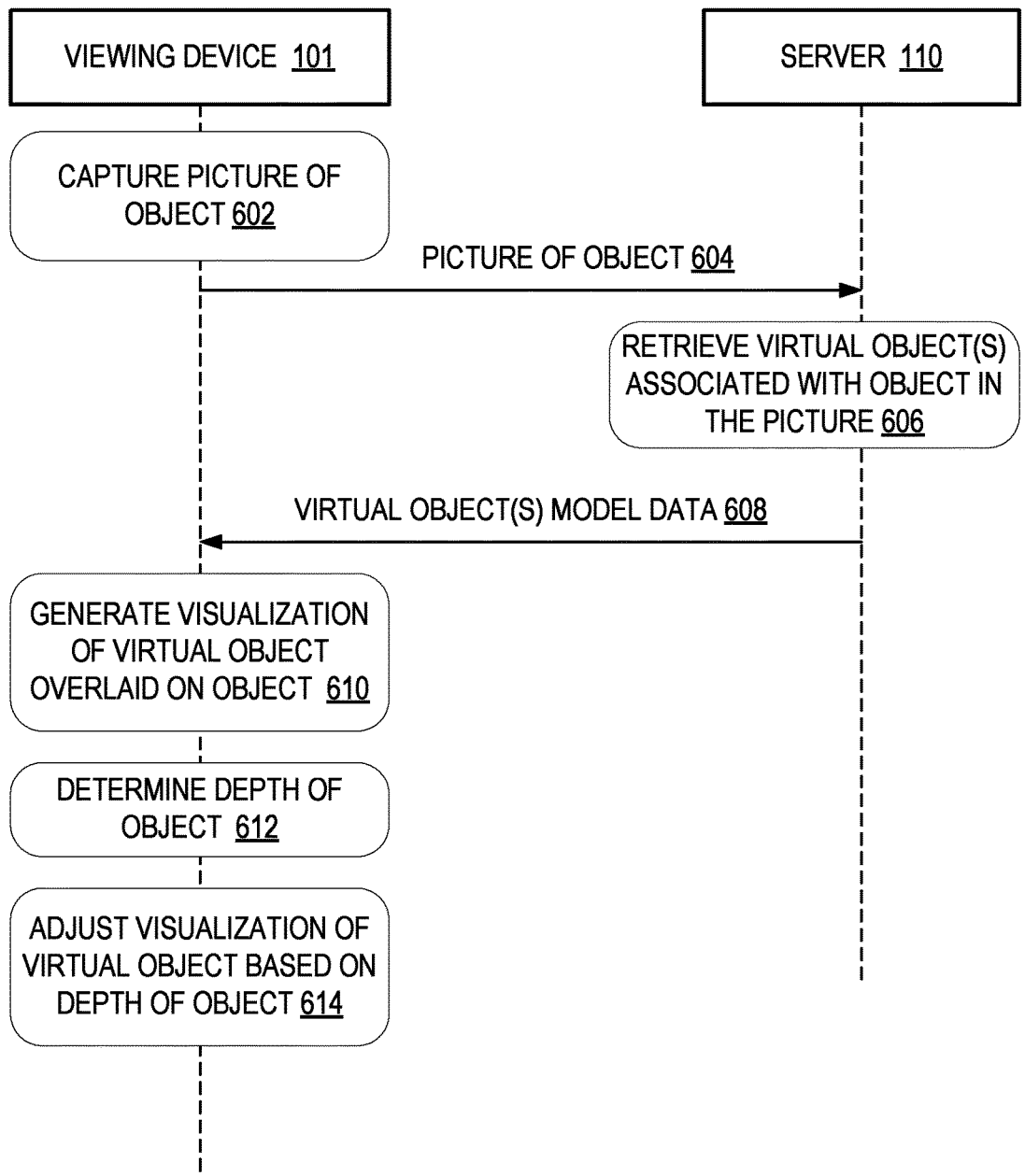
FIG. 6 is an interaction diagram illustrating an example embodiment of interactions between a viewing device and a server.

FIG. 6 is an interaction diagram illustrating interactions between the viewing device 101 and the server 110, in accordance with some example embodiments. At operation 602, the viewing device 101 takes a picture of the object 116. At operation 604, the viewing device 101 sends the picture of the object 116 to the server 110. At operation 606, the server 110 retrieves the virtual object associated with the object in the picture. At operation 608, the server 110 sends the virtual object model data (e.g., 3D model) to the viewing device 101 for rendering. At operation 610, the viewing device 101 generates a visualization of the virtual object in the display 204. At operation 612, the viewing device 101 determines a depth of object 116. At operation 614, the viewing device 101 adjusts the visualization of the virtual object (e.g., adjust size and/or shape) based on the computed depth of the object.

Figure 7:
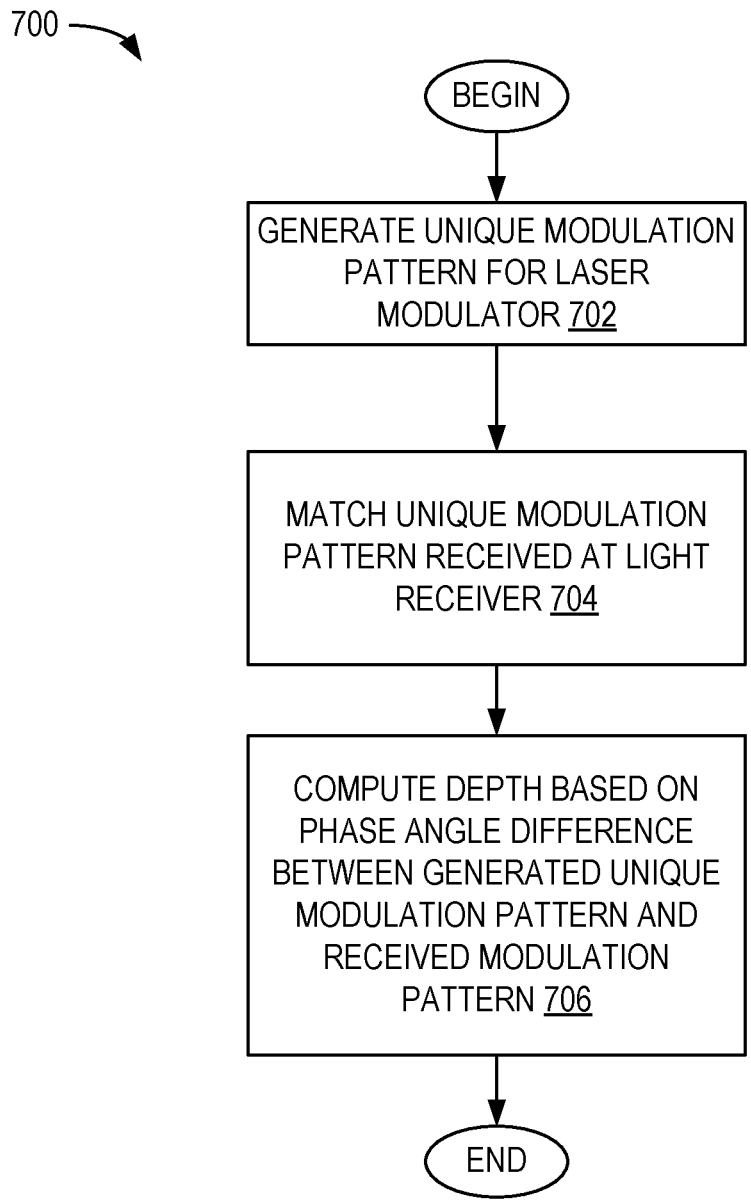
FIG. 7 is a flowchart illustrating an example method of computing depth using a light-based radar system.

FIG. 7 is a flowchart illustrating an example method 700 of computing depth using a light-based radar system. At operation 702, a unique modulation pattern is generated. In one example embodiment, operation 702 may be implemented with the unique signal pattern generator 402 connected to the light modulator 302 of FIGS. 2 and 3.

At operation 704, the unique modulation pattern is matched at the receiver 306. In one example embodiment, operation 704 may be implemented with the depth computation module 408 connected to the receiver 306 to compute the phase angle shift between the matched unique modulation pattern and to determine the depth based on the phase angle shift.

At operation 706, the depth of points or sampling points on the surface of the object 116 is computed. In one example embodiment, operation 706 may be implemented with the depth computation module 408 of FIG. 4.

Figure 8:
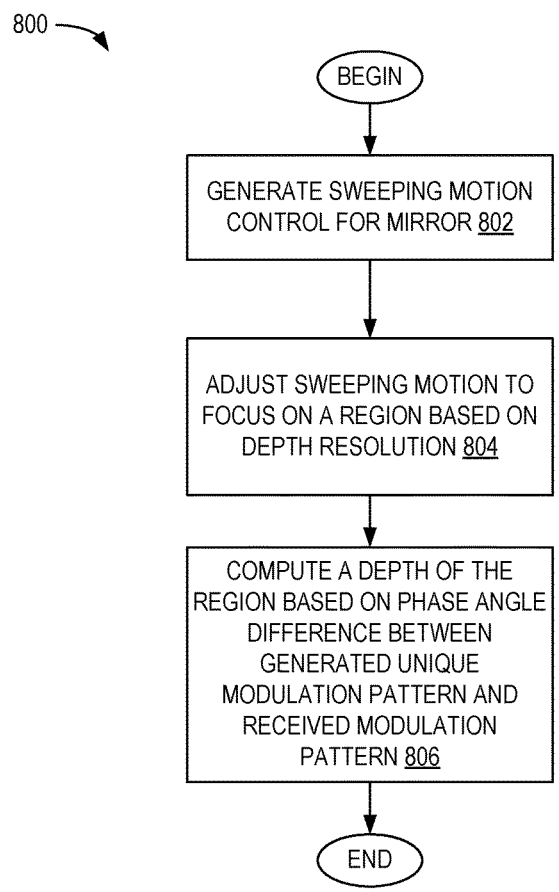
FIG. 8 is a flowchart illustrating another example method of computing depth using a light-based radar system.

FIG. 8 is a flowchart illustrating another example method 800 of computing depth using a light-based radar system. At operation 802, the viewing device 101 generates a sweeping motion control for its mirror to create a scanning planar region. In one example embodiment, operation 802 may be implemented using the sweeping module 404 connected to the mirror controller 308 of FIGS. 2 and 3.

At operation 804, the viewing device 101 adjusts the frequency of the sweeping motion to focus on a region based on the depth resolution. In one example embodiment, operation 804 may be implemented using the focus module 406 connected to the mirror controller 308 of FIGS. 2 and 3.

At operation 806, the viewing device 101 computes a depth of the region based on phase angle differences between the generated unique modulation pattern and the received modulation pattern. In one example embodiment, operation 806 may be implemented with the depth computation module 408 of FIG. 4.

Figure 9:
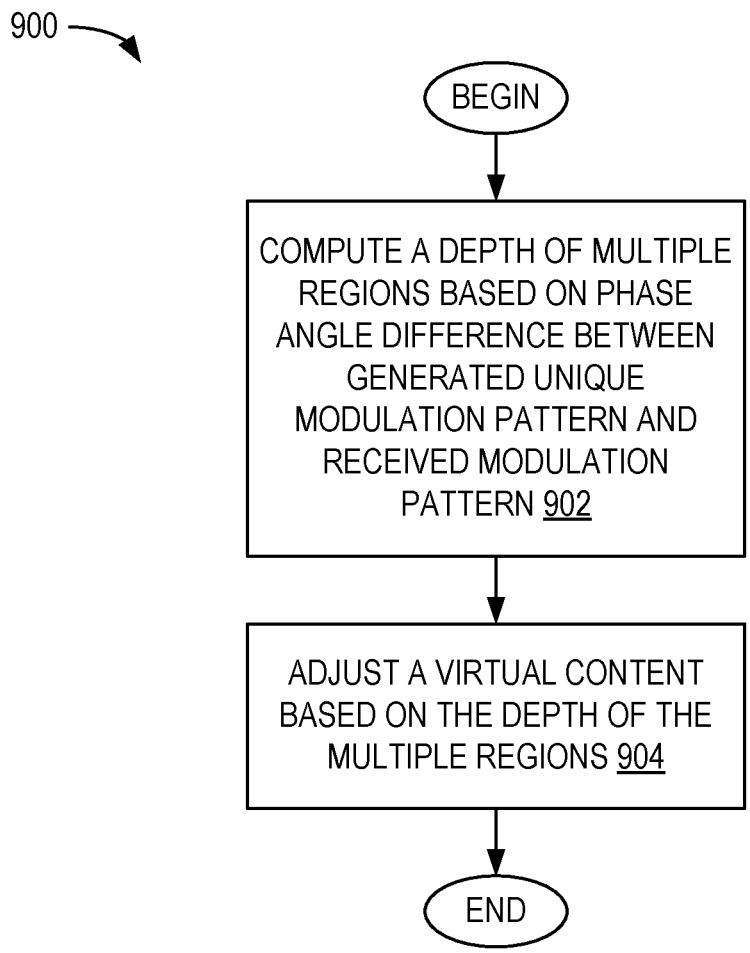
FIG. 9 is a flowchart illustrating an example method of adjusting a virtual content based on the computed depth using a light-based radar system.

FIG. 9 is a flowchart illustrating an example method of adjusting a virtual content based on the computed depth using a light-based radar system. At operation 902, the viewing device 101 computes a depth of multiple regions based on phase angle differences between the generated unique modulation pattern and the receive modulation pattern. In one example embodiment, operation 902 may be implemented with the depth computation module 408 of FIG. 4.

At operation 904, the viewing device 101 adjusts a virtual content based on the depth of the multiple regions. In one example embodiment, operation 904 may be implemented using the rendering module 212 of the viewing device 101 in FIG. 2.

Figure 10:
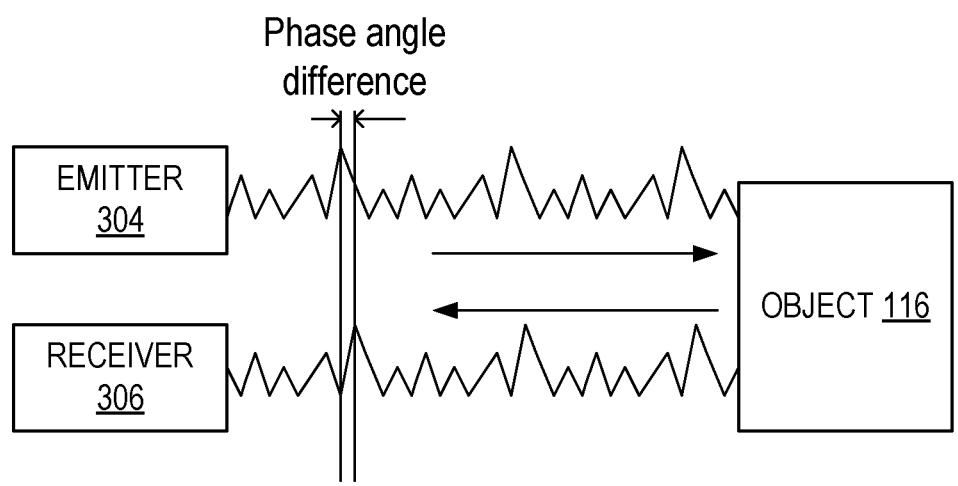
FIG. 10 is a diagram illustrating an example operation of a light-based radar system.

FIG. 10 is a diagram illustrating an example operation of a light-based radar system. The emitter 304 generates a modulated wave signal having a unique pattern (non-repetitive for a time delta t) towards the object 116. The receiver 306 collects the photons from the modulated wave signal reflected back from the surface of the object 116. The depth computation module 408 determines the phase angle difference between the modulated wave signal sent from the emitter 304 and the modulated wave signal received at the receiver 306.

Figure 11:
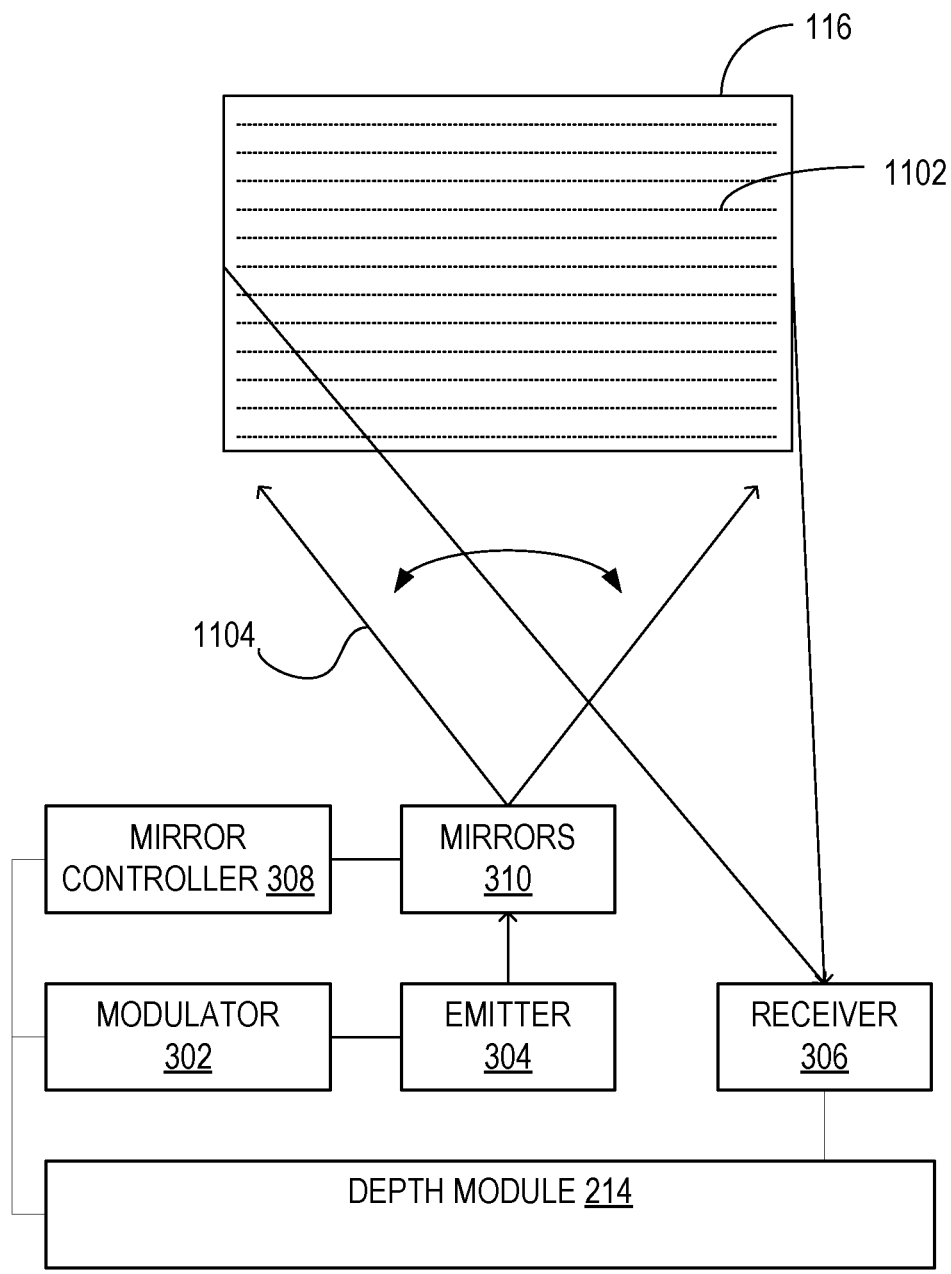
FIG. 11 is a diagram illustrating an example operation of sweeping using a light-based radar system.

FIG. 11 is a diagram illustrating an example operation of sweeping using a light-based radar system. The modulator 302 modulates a light signal generated by the emitter 304 as previously described. The mirror controller 308 control mirror 310 (e.g., micromirrors) to sweep the light signal into a planar region 116 formed with sampling points 1102. The receiver 306 captures the reflected light. The depth module 214 computes the distance based on the phase angle difference between the light signal generated by the emitter 304 and the light signal received at the receiver 306.

Figure 12:
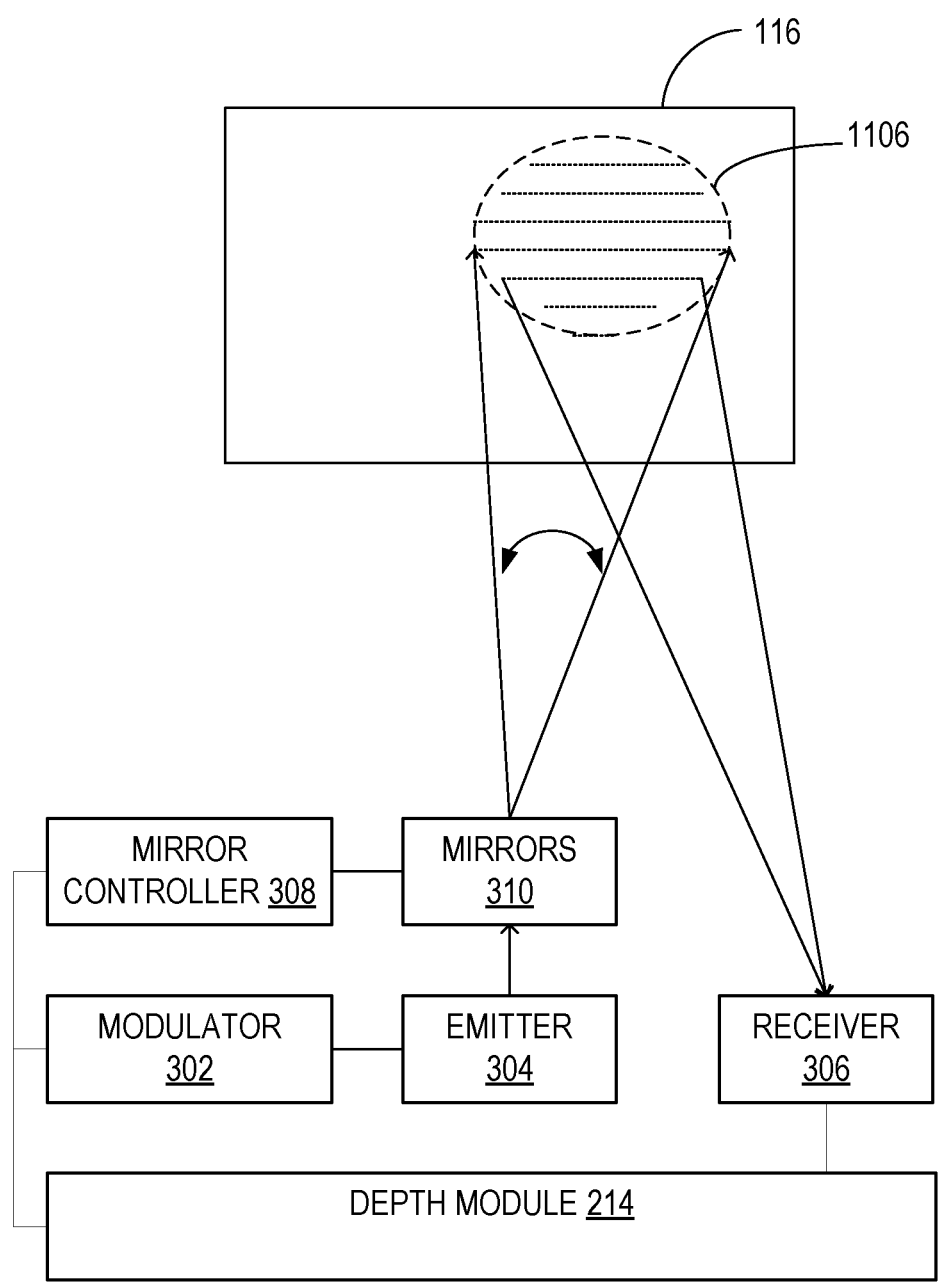
FIG. 12 is a diagram illustrating an example operation of focusing using a light-based radar system.

FIG. 12 is a diagram illustrating an example operation of focusing using a light-based radar system. The system can focus on an area of interest 1106 to further increase the accuracy of the depth measurement. For example, the mirror controller 308 controls the mirrors 310 to focus and sweep a region corresponding to the area of interest 1106. In other embodiments, the mirror controller 308 sweeps the region 1102 at a lower resolution or frequency and the area of interest 1106 at a higher resolution or frequency. For example, the area of interest 1106 includes a higher density of sampling points than the remaining region 1102. The receiver 306 captures the reflected light from the area of interest 1106. The depth module 214 computes the distance based on the phase angle difference between the light signal generated by the emitter 304 and the light signal received at the receiver 306.

In another embodiment, the receiver 306 is connected to a receiving mirror (shown) that is synchronized with the mirror 310. The receiving mirror reflects or refocuses the received light signal from the area of interest 1106 to the receiver 306.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
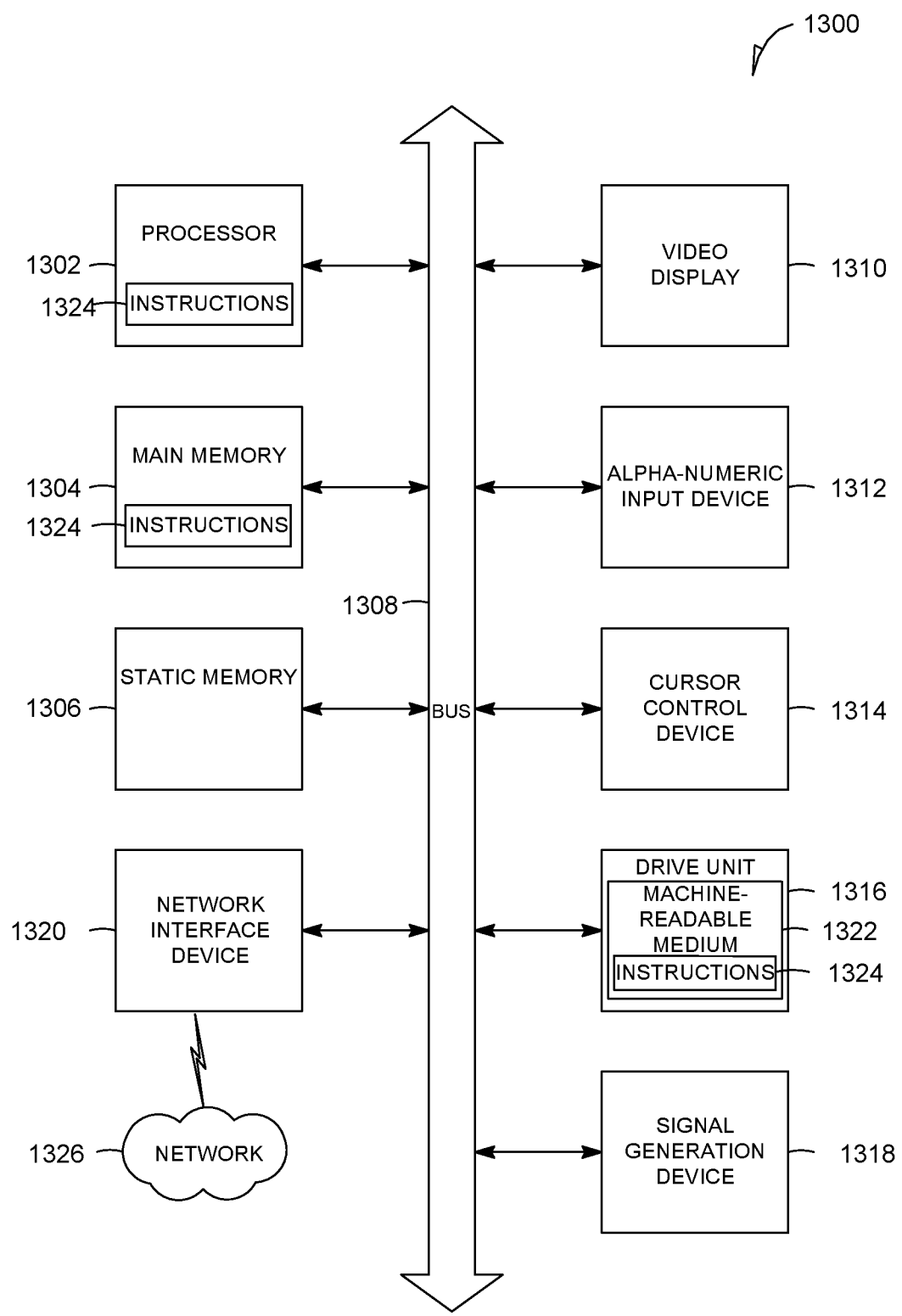
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions 1324 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a computer-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 14:
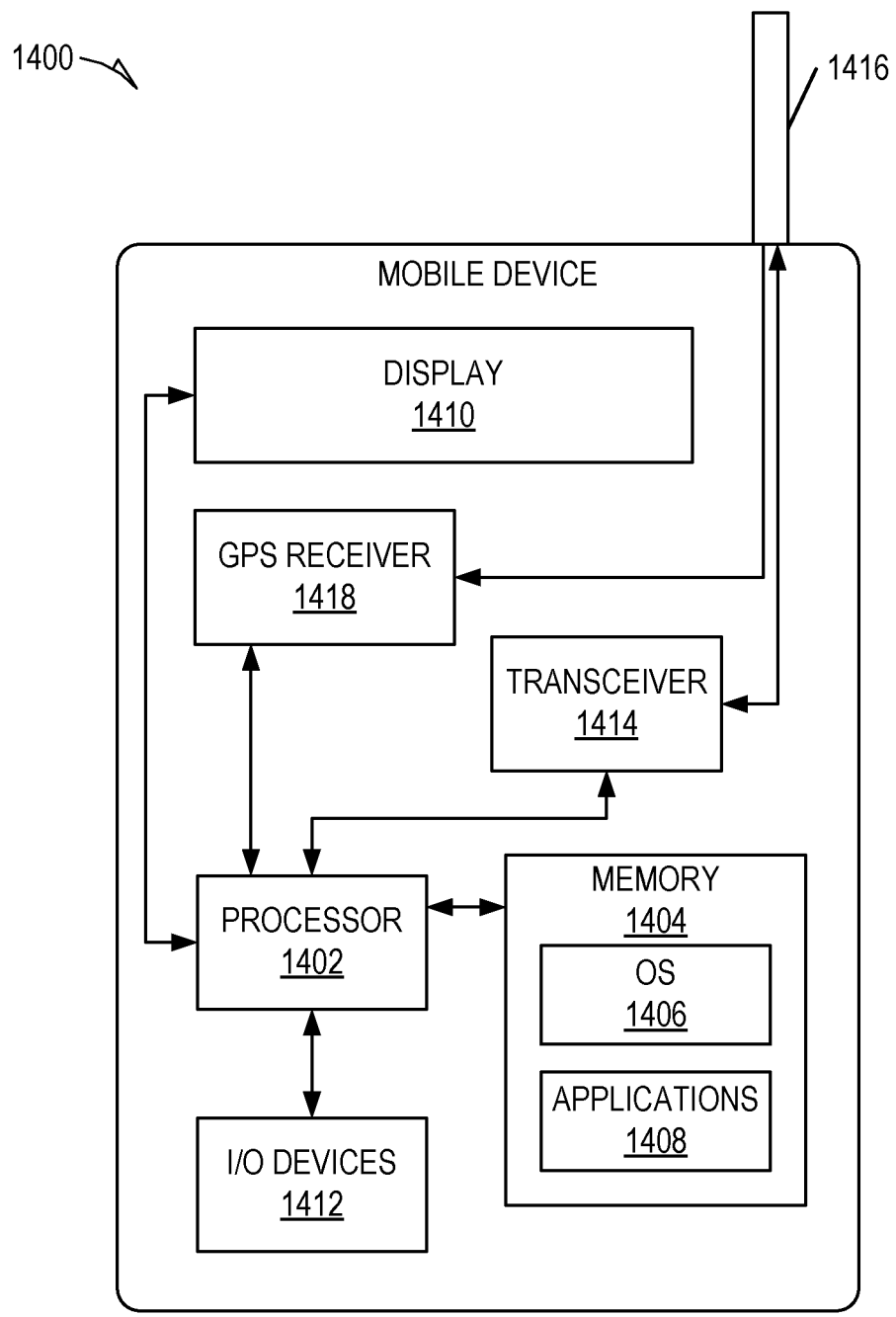
FIG. 14 is a block diagram illustrating a mobile device, according to an example embodiment, configured to perform perform any one or more of the methodologies discussed herein.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following enumerated embodiments describe various example embodiments of methods, machine-readable media, and systems (e.g., machines, devices, or other apparatus) discussed herein.

A first embodiment provides a device (e.g., a light-based radar system) comprising:

an optical radar configured to emit a signal towards an object;
a camera;
a display; and
a hardware processor comprising an augmented reality (AR) application, the AR application being configured to include:
a recognition module configured to identify an object depicted in an image captured with the camera;
a depth sensing module coupled to the optical radar, the depth sensing module being configured to generate the signal with a non-repeating pattern of amplitude and frequency to compute a depth of the object based on a difference in phase angle between the signal emitted from the optical radar and a return signal received at the optical radar, the depth including a distance between the optical radar and the object; and
a rendering module to generate AR content based on the identified object and to adjust a characteristic of the AR content in the display based on the computed depth of the object.

A second embodiment provides a device according to the first embodiment, wherein the optical radar further comprises:

a light modulator configured to modulate a light signal with the non-repeating pattern of amplitude and frequency;
an emitter coupled to the light modulator, the emitter configured to generate the modulated light signal with the non-repeating pattern of amplitude and frequency; and
a receiver configured to receive the return signal including the modulated light signal reflected back from the object.

A third embodiment provides a device according to the first embodiment, wherein the depth sensing module comprises:

a unique signal pattern generator coupled to the light modulator, the unique signal pattern generator being configured to select random amplitude and frequency of the modulated light signal; and
a depth computation module configured to determine a shift in the phase angle between the modulated light signal generated from the emitter and the modulated light signal received at the receiver.

A fourth embodiment provides a device according to the third embodiment, wherein the depth computation module is configured to identify a first pattern in a portion of the modulated light signal generated from the emitter, to identify a second pattern in a portion of the modulated light signal received at the receiver, to match the first pattern with the second pattern, and to determine the shift in the phase angle between the first pattern and the second pattern.

A fifth embodiment provides a device according to the fourth embodiment, wherein the depth computation module is configured to compute the distance between the device and the object based on the shift in the phase angle between the first pattern and the second pattern.

A sixth embodiment provides a device according to the second embodiment, wherein the optical radar further comprises:

a mirror being configured to reflect the modulated light signal; and
a mirror controller configured to adjust a direction of the mirror and sweep the modulated light signal into a planar region.

A seventh embodiment provides a device according to the sixth embodiment, wherein the depth computation module comprises:

a sweeping module coupled to the mirror controller, the sweeping module being configured to generate a sweeping signal to the mirror controller, the sweeping signal identifying a first angle for horizontal sweeps and a second angle for vertical sweeps.

An eighth embodiment provides a device according to the seventh embodiment, wherein the depth computation module further comprises:

a focus module coupled to the mirror controller and the sweeping module, the focus module being configured to adjust the sweeping signal to modify the first angle for horizontal sweeps and the second angle for vertical sweeps and to adjust a size of the planar region.

A ninth embodiment provides a device according to the eighth embodiment, wherein the depth computation module identifies a first region within the planar region, the first region having a depth resolution less than a depth resolution threshold, and wherein the focus module adjusts the sweeping signal to limit the planar region to the first region in response to identifying the first region.

A tenth embodiment provides a device according to the first embodiment, wherein the display comprises a transparent display of a visor of a helmet, wherein the rendering module adjusts a combination of at least a size of the AR content displayed in the transparent display and a depth of field of the AR content based on the measured depth of the object.

What is claimed is:

1. A device comprising:
a camera configured to generate an image depicting an object;
a display;
a light modulator configured to modulate a light signal with a non-repeating pattern of random amplitude and random frequency;
an emitter coupled to the light modulator, the emitter being configured to generate the modulated light signal with the non-repeating pattern of amplitude and frequency, and to emit the modulated light signal;
a receiver configured to receive the return signal including the modulated light signal reflected back from the object;
a mirror configured to reflect the modulated light signal from the emitter towards the object;
a mirror controller coupled to the minor, the mirror controller being configured to adjust a direction of the mirror and to sweep the modulated light signal into a planar region defined by a first angle for horizontal sweeps and by a second angle for vertical sweeps; and
a hardware processor comprising an augmented reality (AR) application, the AR application being configured to:
identify the object depicted in the image;
compute a depth of the object based on a difference in phase angle between the emitted modulated light signal and the received return signal, the depth including a distance between the device and the object;

identify a first depth resolution of the planar region;
identify an area of interest in the planar region;
adjust the first angle and the second angle to sweep the modulated light signal in the area of interest at a second depth resolution that is higher than the first depth resolution, the second depth resolution having a higher density of sampling points than that of the first depth resolution; and
generate AR content based on the identified object and to adjust a characteristic of the AR content in the display based on the computed depth of the object.

2. The device of claim 1, wherein the depth sensing module comprises:
a unique signal pattern generator coupled to the light modulator, the unique signal pattern generator being configured to select the random amplitude and random frequency of the modulated light signal; and
a depth computation module configured to determine a shift in the phase angle between the modulated light signal generated from the emitter and the modulated light signal received at the receiver.

3. The device of claim 2, wherein the depth computation module is configured to identify a first pattern in a portion of the modulated light signal generated from the emitter, to identify a second pattern in a portion of the modulated light signal received at the receiver, to match the first pattern with the second pattern, and to determine the shift in the phase angle between the first pattern and the second pattern.

4. The device of claim 3, wherein the depth computation module is configured to compute the distance between the device and the object based on the shift in the phase angle between the first pattern and the second pattern.

5. The device of claim 1, wherein the display comprises a transparent display of a visor of a helmet,
wherein the rendering module adjusts a combination of at least a size of the AR content displayed in the transparent display and a depth of field of the AR content based on the measured depth of the object.

6. A method comprising:
identifying an object depicted in an image captured with a camera of a device;
modulating a light signal with a non-repeating pattern of random amplitude and random frequency;
reflecting the modulated light signal from the emitter on a mirror towards the object;
adjusting a direction of the mirror to sweep the modulated light signal into a planar region defined by a first angle for horizontal sweeps and by a second angle for vertical sweeps;
computing, using a processor of the device, a depth of the object based on a difference in phase angle between the emitted modulated light signal and the received return signal, the depth including a distance between the device and the object;
identifying a first depth resolution of the planar region;
identifying an area of interest in the planar region;
adjusting the first angle and the second angle to sweep the modulated light signal in the area of interest at a second depth resolution that is higher than the first depth resolution, the second depth resolution having a higher density of sampling points than that of the first depth resolution;
generating and displaying AR content based on the identified object in a display of the device; and
adjusting a characteristic of the AR content in the display based on the computed depth of the object.

7. The method of claim 6, further comprising:
selecting the random amplitude and random frequency of the modulated light signal; and
determining a shift in the phase angle between the modulated light signal generated from the emitter and the modulated light signal received at the receiver.

8. The method of claim 7, further comprising:
identifying a first pattern in a portion of the modulated light signal generated from the emitter;
identifying a second pattern in a portion of the modulated light signal received at the receiver;
matching the first pattern with the second pattern; and
determining the shift in the phase angle between the first pattern and the second pattern.

9. The method of claim 7, further comprising:
computing the distance between the device and the object based on the shift in the phase angle between the first pattern and the second pattern.

10. A non-transitory machine-readable medium comprising instructions that, when executed by one or more processors of a machine, cause the machine to perform operations comprising:
modulating a light signal with a non-repeating pattern of random amplitude and random frequency;
reflecting the modulated light signal from the emitter on a mirror towards the object;
adjusting a direction of the mirror to sweep the modulated light signal into a planar region defined by a first angle for horizontal sweeps and by a second angle for vertical sweeps;
computing a depth of the object based on a difference in phase angle between the emitted modulated light signal and the received return signal, the depth including a distance between the device and the object;
identifying a first depth resolution of the planar region;
identifying an area of interest in the planar region;
adjusting the first angle and the second angle to sweep the modulated light signal in the area of interest at a second depth resolution that is higher than the first depth resolution, the second depth resolution having a higher density of sampling points than that of the first depth resolution;
generating and displaying AR content based on the identified object in a display of the device; and
adjusting a characteristic of the AR content in the display based on the computed depth of the object.

* * * * *